(12) United States Patent
Hagen et al.

(10) Patent No.: US 9,538,774 B2
(45) Date of Patent: Jan. 10, 2017

(54) METHOD OF FEEDING LIVESTOCK TO IMPROVE CARCASS CHARACTERISTICS

(71) Applicant: Value-Added Science & Technology, LLC., Mason City, IA (US)

(72) Inventors: Chad D Hagen, Sleepy Eye, MN (US);
Steven P Weiss, Mason City, IA (US);
Wayne Cast, Princeton, MO (US);
Kenneth W Purser, Quincy, IL (US);
Ran Song, Edina, MN (US); Dale Green, Mankato, MN (US)

(73) Assignee: Nutriquest, LLC, Mason City, IA (US)

( * ) Notice: Subject to any disclaimer, the term of this patent is extended or adjusted under 35 U.S.C. 154(b) by 236 days.

(21) Appl. No.: 13/803,002

(22) Filed: Mar. 14, 2013

(65) Prior Publication Data

US 2014/0121275 A1   May 1, 2014

Related U.S. Application Data

(60) Provisional application No. 61/719,568, filed on Oct. 29, 2012.

(51) Int. Cl.
*A23K 1/16* (2006.01)

(52) U.S. Cl.
CPC .............. *A23K 1/164* (2013.01); *A23K 10/38* (2016.05); *A23K 20/158* (2016.05); *A23K 50/10* (2016.05); *A23K 50/30* (2016.05); *A23K 50/75* (2016.05); *Y02P 60/873* (2015.11)

(58) Field of Classification Search
CPC ...... A23K 1/164; A23K 20/158; A23K 50/10; A23K 10/38; A23K 50/30; A23K 50/75; Y02P 60/873
See application file for complete search history.

(56) References Cited

U.S. PATENT DOCUMENTS

2007/0282010 A1*  12/2007  Aberg ............................ 514/651
2009/0148560 A1*   6/2009  Shiba et al. .................... 426/61

OTHER PUBLICATIONS

Irie M, K Ohomoto and M. Sakimoto 1984, Effects of cyclopropenoid fatty acids on soft fat pork. Final reports for research grants for meat and meat products 2:182-189.*
Pauly et al. ( Animal (2009), 3:7, pp. 1057-1066 & The Animal Consortium 2009 doi:10.1017/S1751731109004418).*

* cited by examiner

*Primary Examiner* — Snigdha Maewall
(74) *Attorney, Agent, or Firm* — Camille L. Urban; David M. Breiner; BrownWinick Law Firm

(57) ABSTRACT

Feeding a diet supplemented with DDGS or another supplement containing UFA at a level above a threshold to animals such as swine, cattle, and poultry can have negative effects on carcass fat, certain growth parameters, and meat characteristics. However, if this diet is provided with a second supplement that contains CPFA at specified levels in the diet, the negative effects otherwise expected are wholly or at least partially countered. The invention recommends employing a supplemental source of CPFA between about 0.001% and about 0.5% of the diet by weight. Negative effects on carcass characteristics caused by ractopamine can also be countered by the addition of this amount of at least one source of CPFA in the diet.

9 Claims, 11 Drawing Sheets

FIGURE 1

Nutrient composition of experimental diets

| Item | Treatments[1] | |
|---|---|---|
| | 1 (Negative control) | 3 (0.075% CPFA) |
| Ingredient, % | | |
| Corn, ground | 46.14 | 46.14 |
| DDGS, Hopkinsville | 40.00 | 40.00 |
| Soybean meal, 48% | 9.55 | 9.55 |
| CPFA source | - | 0.50 |
| Soybean oil | 2.10 | 1.60 |
| Limestone | 1.25 | 1.25 |
| Salt | 0.40 | 0.40 |
| Lysine, 98.5 | 0.36 | 0.36 |
| Vitamin premix | 0.075 | 0.075 |
| Mineral premix | 0.075 | 0.075 |
| Copper sulfate | 0.050 | 0.050 |
| Optiphos 2000 | 0.006 | 0.006 |
| Total | 100.00 | 100.00 |
| Calculated nutrient composition, % | | |
| ME, kcal/kg | 3,205 | 3,205[2] |
| Total lysine, % | 0.933 | 0.933 |
| Unsaturated Fat, % | 7.000 | 7.000 |
| Ca, % | 0.574 | 0.574 |
| P, % | 0.503 | 0.503 |
| P avail, % | 0.217 | 0.217 |
| P release, % | 0.052 | 0.052 |

[1] Diet 2 (0.0375% CPFA) was made by blending diet 1 (negative control) with diet 3 (0.075% CPFA).
[2] ME for diet containing CPFA assumed to be the same as the control diet.

FIGURE 2

Effects of dietary supplementation of CPFA on growth performance and carcass characteristics in finishing pigs (values are least square means)

| Item | Treatment[1] | | | | | PSE[2] | P-value |
|---|---|---|---|---|---|---|---|
| | 1 | 2 | 3 | 4 | 5 | | |
| Growth performance | | | | | | | |
| No. of pigs | 4 | 4 | 4 | 4 | 4 | | |
| Final BW, kg | 122.0 | 121.9 | 119.5 | 119.4 | 121.1 | 5.4 | 0.931 |
| ADG, kg | 0.90 | 0.92 | 0.88 | 0.88 | 0.91 | 0.07 | 0.876 |
| ADFI, kg | 2.55 | 2.76 | 2.73 | 2.85 | 2.75 | 0.34 | 0.871 |
| F:G | 2.83 | 2.99 | 3.09 | 3.25 | 3.00 | 0.08 | 0.915 |
| Carcass characteristics | | | | | | | |
| No. of pigs | 4 | 4 | 4 | 4 | 4 | | |
| Live body weight, kg | 122.2 | 121.6 | 119.2 | 119.4 | 120.9 | 5.5 | 0.930 |
| Hot carcass weight, kg | 91.7 | 90.7 | 89.1 | 89.5 | 90.4 | 4.7 | 0.958 |
| Dressing, % | 75.02 | 74.58 | 74.77 | 74.94 | 74.75 | 0.90 | 0.969 |
| 10th rib backfat depth, cm | 2.56 | 2.29 | 2.29 | 2.38 | 2.86 | 0.21 | 0.029 |
| Loin eye area, cm[3] | 50.71 | 49.03 | 52.74 | 52.42 | 45.97 | 5.94 | 0.524 |
| Fat-free carcass lean, % | 52.95 | 53.63 | 54.84 | 54.47 | 50.55 | 1.79 | 0.068 |
| pH, 45 min | 6.35 | 6.11 | 5.75 | 6.05 | 6.04 | 0.21 | 0.073 |
| pH, ultimate | 5.56 | 5.54 | 5.48 | 5.51 | 5.52 | 0.11 | 0.872 |
| Loin muscle color[4], L* | 55.32 | 59.72 | 58.49 | 62.14 | 61.61 | 3.76 | 0.272 |
| Loin muscle color[4], a* | 7.74 | 8.18 | 9.35 | 7.83 | 8.63 | 1.37 | 0.535 |
| Loin muscle color[4], b* | 14.46 | 16.39 | 15.93 | 16.18 | 16.60 | 1.74 | 0.644 |
| Loin muscle marbling[5] | 2.31 | 1.75 | 2.25 | 1.00 | 2.00 | 0.83 | 0.292 |

[1] Treatment: 1 = negative control (without CPFA supplement); 2 = diet containing 0.0375% CPFA 4 wks before harvest; 3 = diet containing 0.075% CPFA 4 wks before harvest; 4 = diet containing 0.0375% CPFA 6 wks before harvest; 5 = diet containing 0.075% CPFA 6 wks before harvest
[2] PSE = Pooled standard error
[3] Loin eye area adjusted on a constant live weight basis (NPPC, 2000)
[4] L*: 100 = white, 0 = black; a*: positive value = red, negative value = green; b*: positive value = yellow, negative value = blue
[5] Higher marbling scores indicate an increased amount of intramuscular fat; visual scale, percentage (NPPC, 2000)

FIGURE 3

Effects of dietary supplementation of CPFA on fatty acid profile of belly fat and belly firmness (values are least square means)

| Item | Treatment[1] | | | | | PSE[2] | P-value |
|---|---|---|---|---|---|---|---|
| | 1 | 2 | 3 | 4 | 5 | | |
| No. of pigs | 4 | 4 | 4 | 4 | 4 | - | - |
| Fatty acid, % of total fat | | | | | | | |
| C14:0 | 1.26 | 1.36$^x$ | 1.32$^x$ | 1.45$^{a,x,y}$ | 1.56$^{a,y}$ | 0.04 | 0.005 |
| C16:0 | 21.64 | 22.43$^x$ | 22.41$^x$ | 22.60$^{x,y}$ | 23.73$^{a,y}$ | 0.30 | 0.008 |
| C16:1 | 1.87 | 1.67 | 1.59 | 1.40$^b$ | 1.45$^b$ | 0.11 | 0.063 |
| C18:0 | 10.67 | 12.88$^{b,x}$ | 14.60$^{a,x,y}$ | 15.12$^{a,y}$ | 16.57$^{a,y}$ | 0.52 | <0.001 |
| C18:1 | 37.70 | 34.59 | 34.25 | 31.48$^a$ | 30.93$^a$ | 1.14 | 0.012 |
| C18:2 | 21.69 | 21.94 | 20.92 | 22.77 | 20.82 | 0.91 | 0.573 |
| C18:3 | 1.23 | 1.23 | 1.14 | 1.28 | 1.13 | 0.05 | 0.299 |
| C20:0 | 0.22 | 0.23 | 0.23 | 0.27$^b$ | 0.27$^b$ | 0.01 | 0.047 |
| C20:1 | 0.89 | 0.83 | 0.82 | 0.83 | 0.80 | 0.04 | 0.366 |
| C20:3 | 0.14 | 0.14 | 0.14 | 0.16 | 0.14 | 0.01 | 0.231 |
| C20:4 | 0.30 | 0.29$^z$ | 0.25$^{b,z,w}$ | 0.27$^{z,w}$ | 0.24$^{a,w}$ | 0.01 | 0.015 |
| C18:1/C18:0 | 3.55 | 2.76$^{b,x}$ | 2.36$^{a,xy}$ | 2.09$^{a,x,y}$ | 1.88$^{a,y}$ | 0.19 | <0.001 |
| SFA[3] | 34.07 | 37.24$^{a,x}$ | 38.89$^{a,x}$ | 39.78$^{a,x}$ | 42.49$^{a,y}$ | 0.65 | <0.001 |
| MUFA[4] | 40.82 | 37.49 | 37.02 | 34.02$^a$ | 33.54$^a$ | 1.26 | 0.013 |
| PUFA[5] | 23.48 | 23.76 | 22.58 | 24.59 | 22.45 | 0.98 | 0.541 |
| IV | 75.68 | 73.25$^x$ | 70.87$^{a,x,y}$ | 71.82$^{b,x}$ | 67.67$^{a,y}$ | 0.93 | 0.002 |
| Belly firmness, degree[6] | 10.30 | 8.85 | 15.02 | 13.31 | 17.69 | 2.73 | 0.227 |

[1]Treatment: 1 = negative control (without CPFA supplement); 2 = diet containing 0.0375% CPFA 4 wks before harvest; 3 = diet containing 0.075% CPFA 4 wks before harvest; 4 = diet containing 0.0375% CPFA 6 wks before harvest; 5 = diet containing 0.075% CPFA 6 wks before harvest
[2]PSE = Pooled standard error
[3]SFA = Saturated fatty acids
[4]MUFA = Monounsaturated fatty acids
[5]PUFA = Polyunsaturated fatty acids
[6]Belly firmness, degree : a larger degree indicates a firmer belly
[a] Means within a row differ than negative control ($P < 0.05$)
[b] Means within a row tend to differ than negative control ($P < 0.10$)
[x,y] Means within a row without a common superscript of x, y differ ($P < 0.05$)
[z,w] Means within a row without a common superscript of z, w differ ($P < 0.10$)
Nonprovisional Application for: Method of Feeding Livestock to Improve Carcass Characteristics

FIGURE 4

Composition of experimental diets

| Item | Wk 1 – 3 (175-205 lb ration) | | Wk 3 – 6 (205-230 lb ration) | | | |
|---|---|---|---|---|---|---|
| | CON[1] | CPFA[2] | CON[1] | CON/Ractopamine[3] | CPFA[2] | CPFA/Ractopamine[4] |
| Ingredients, lb | | | | | | |
| Corn | 891.90 | 891.90 | 953.50 | 778.49 | 953.50 | 778.49 |
| Soybean meal, 46% | 210.00 | 210.00 | 145.00 | 305.00 | 145.00 | 305.00 |
| DDGS - Aurora, SD | 800.00 | 800.00 | 800.00 | 800.00 | 800.00 | 800.00 |
| Choice white grease | 52.50 | 47.50 | 57.00 | 67.00 | 52.00 | 62.00 |
| CPFA source | □ | 5.00 | □ | □ | 5.00 | 5.00 |
| Limestone | 23.80 | 23.80 | 23.70 | 23.80 | 23.70 | 23.80 |
| Salt | 8.00 | 8.00 | 8.00 | 8.00 | 8.00 | 8.00 |
| GF 4# VTM with Enzyme | 3.80 | 3.80 | 3.60 | 3.60 | 3.60 | 3.60 |
| Lysine sulfate | 10.00 | 10.00 | 9.20 | 11.20 | 9.20 | 11.20 |
| Threonine 98.5% | □ | □ | □ | 0.20 | □ | 0.20 |
| Zinc oxide 72% | □ | □ | □ | 0.21 | □ | 0.21 |
| Potassium chloride | □ | □ | □ | 2.00 | □ | 2.00 |
| RACTOPAMINE 9 grams/ton | □ | □ | □ | 0.50 | □ | 0.50 |
| Total | 2000 | 2000 | 2000 | 2000 | 2000 | 2000 |

[1] CON = negative control without CPFA and ractopamine
[2] CPFA = diet containing 0.0375% CPFA
[3] CON/Ractopamine = diet containing 4.5 grams/ton ractopamine for 3 weeks prior to harvest
[4] CPFA/Ractopamine = diet containing 0.0375% CPFA and 4.5 grams/ton ractopamine for 3 weeks prior to harvest

FIGURE 5

Effects of CPFA and ractopamine on growth performance, and carcass characteristics of finishing pigs (least square means)

| Item | CON[1] | CON/Ractopamine[3] | CPFA[2] | CPFA/Ractopamine[4] | SE | P-value CPFA | Ractopamine | CPFA x Ractopamine |
|---|---|---|---|---|---|---|---|---|
| Growth performance | | | | | | | | |
| Week 1 to 3 | | | | | | | | |
| No. of pens[5] | 11 | 12 | 11 | 10 | | | | |
| ADG, lb | 2.21 | 2.25 | 2.22 | 2.31 | 0.03 | 0.15 | — | — |
| ADFI, lb | 6.26 | 6.41 | 6.38 | 6.47 | 0.08 | 0.23 | — | — |
| F:G | 2.83 | 2.85 | 2.87 | 2.80 | 0.02 | 0.79 | — | — |
| Week 3 to 6 | | | | | | | | |
| No. of pens | 12 | 12 | 12 | 12 | | | | |
| ADG, lb | 2.04 | 2.42 | 2.14 | 2.37 | 0.04 | 0.61 | <0.001 | 0.12 |
| ADFI, lb | 6.49 | 6.62 | 6.60 | 6.46 | 0.12 | 0.85 | 0.94 | 0.24 |
| F:G | 3.18 | 2.75 | 3.12 | 2.75 | 0.06 | 0.60 | <0.001 | 0.57 |
| Week 1 to 6; overall | | | | | | | | |
| No. of pens | 12 | 12 | 12 | 12 | | | | |
| Initial BW, lb | 189.0 | 189.2 | 189.7 | 190.0 | 2.4 | 0.47 | 0.78 | 0.97 |
| Final BW, lb | 275.8 | 284.9 | 278.9 | 283.7 | 1.3 | 0.49 | <0.001 | 0.11 |
| ADG, lb | 2.13 | 2.33 | 2.18 | 2.31 | 0.03 | 0.64 | <0.001 | 0.29 |
| ADFI, lb | 6.37 | 6.52 | 6.49 | 6.43 | 0.09 | 0.88 | 0.64 | 0.28 |
| F:G | 2.99 | 2.80 | 2.98 | 2.78 | 0.03 | 0.66 | <0.001 | 0.88 |
| Carcass characteristics[6] | | | | | | | | |
| No. of pens | 12 | 12 | 12 | 12 | | | | |

FIGURE 5 continued

| | | | | | | | |
|---|---|---|---|---|---|---|---|
| HCW, lb | 200.3 | 201.3 | 196.5 | 200.7 | 1.9 | 0.23 | 0.16 | 0.39 |
| Dressing, % | 73.91 | 74.69 | 73.52 | 74.26 | 0.74 | 0.59 | 0.31 | 0.98 |
| Backfat depth, mm | 19.28 | 17.35 | 18.72 | 17.94 | 0.80 | 0.98 | 0.10 | 0.47 |
| Loin depth, mm | 65.41 | 66.06 | 63.06 | 67.59 | 1.65 | 0.80 | 0.12 | 0.24 |
| Carcass lean, % | 55.20 | 56.37 | 55.18 | 56.07 | 0.53 | 0.75 | 0.04 | 0.77 |

[1]CON = negative control without CPFA and ractopamine
[2]CPFA = diet containing 0.0375% CPFA
[3]CON/Ractopamine = diet containing 4.5 grams/ton ractopamine for 3 weeks prior to harvest
[4]CPFA/Ractopamine = diet containing 0.0375% CPFA and 4.5 grams/ton ractopamine for 3 weeks prior to harvest
[5]One pen in CON, one pen in CPFA and two pens in CPFA/Ractopamine were removed due to jumping pigs between pens.
[6]For each pen, one barrow and one gilt weighing closest to the mean BW of their pen were selected based on visual judgment for evaluation of carcass characteristics.

FIGURE 6

Effects of dietary supplementation of CPFA and Ractopamine on loin muscle quality (values are least square means)

| Item | CON[1] | | CPFA[2] | | SE | P-value | | |
|---|---|---|---|---|---|---|---|---|
| | CON | CON/Ractopamine[3] | CPFA | CPFA/Ractopamine[4] | | CPFA | Ractopamine | CPFA x Ractopamine |
| No. of pigs | 23 | 24 | 24 | 22 | | | | |
| No. of pens | 12 | 12 | 12 | 12 | | | | |
| Color | | | | | | | | |
| Japanese color score[5] | 3.47 | 3.35 | 3.38 | 3.47 | 0.15 | 0.94 | 0.94 | 0.42 |
| Minolta L* | 46.02 | 45.63 | 45.80 | 45.63 | 0.46 | 0.81 | 0.54 | 0.82 |
| Minolta a* | 13.69 | 13.08 | 13.80 | 12.94 | 0.18 | 0.93 | <0.001 | 0.49 |
| Minolta b* | 3.17 | 2.94 | 3.21 | 2.89 | 0.14 | 1.00 | 0.05 | 0.76 |
| Ultimate pH | 5.81 | 5.83 | 5.81 | 5.84 | 0.02 | 0.65 | 0.28 | 0.90 |
| Loin purge, % | 0.91 | 0.83 | 1.03 | 0.83 | 0.18 | 0.73 | 0.45 | 0.74 |
| Chop purge, % | 0.95 | 0.98 | 0.89 | 0.87 | 0.14 | 0.48 | 1.00 | 0.82 |
| Marbling score[6] | 1.49 | 1.48 | 1.58 | 1.40 | 1.48 | 0.90 | 0.27 | 0.31 |
| Instron force, kg | 6.17 | 6.92 | 6.13 | 6.50 | 0.22 | 0.27 | 0.01 | 0.37 |
| Cooking loss, % | 20.27 | 19.90 | 19.60 | 17.72 | 0.63 | 0.03 | 0.08 | 0.24 |
| Sensory evaluation | | | | | | | | |
| Juiciness[7] | 6.88 | 6.67 | 6.92 | 7.15 | 0.25 | 0.30 | 0.96 | 0.38 |
| Tenderness[8] | 6.89 | 4.88 | 6.42 | 6.23 | 0.36 | 0.23 | 0.003 | 0.01 |
| Chewiness[9] | 4.59 | 6.42 | 4.79 | 5.12 | 0.43 | 0.19 | 0.01 | 0.07 |
| Flavor[10] | 3.07 | 2.33 | 2.47 | 2.47 | 0.18 | 0.24 | 0.06 | 0.06 |

FIGURE 6 continued

| Off-flavor[11] | 2.06 | 2.13 | 2.38 | 2.34 | 0.26 | 0.31 | 0.94 | 0.85 |

[1]CON = negative control without CPFA and ractopamine
[2]CPFA = diet containing 0.0375% CPFA
[3]CON/Ractopamine = diet containing 4.5 grams/ton ractopamine for 3 weeks prior to harvest
[4]CPFA/Ractopamine = diet containing 0.0375% CPFA and 4.5 grams/ton ractopamine for 3 weeks prior to harvest
[5]Japanese color score: 1 = extremely pale to 6 = extremely dark
[6]Marbling score: 1 = 1% intramuscular fat to 10 = 10% intramuscular fat
[7]Juiciness: 1 = extremely dry to 10 = extremely juicy
[8]Tenderness: 1 = extremely tough to 10 = extremely tender
[9]Chewiness: 1 = extremely not chewy to 10 = extremely chewy
[10]Flavor: 1 = none to 10 = extremely intense. One outlier in CPFA treatment was removed because it fell outside the 1.5 Interquartile Range.
[11]Off-flavor: 1 = none to 10 = extremely intense. Two outliers in CPFA/Ractopamine treatment were removed because they fell outside the 1.5 Interquartile Range.

FIGURE 7

Effects of dietary supplementation of CPFA and Ractopamine on fatty acid composition, firmness and thickness of belly fat (values are least square means)

| Item | CON[1] | | CPFA[2] | | SE | P-value | | |
|---|---|---|---|---|---|---|---|---|
| | CON | CON/Ractopamine[3] | CPFA | CPFA/Ractopamine[4] | | CPFA | Ractopamine | CPFA x Ractopamine |
| No. of pigs | 23 | 24 | 24 | 22 | | | | |
| No. of pens | 12 | 12 | 12 | 12 | | | | |
| Fatty acid composition, % | | | | | | | | |
| C14:0 | 1.09 | 1.08 | 1.33 | 1.27 | 0.03 | <0.001 | 0.25 | 0.39 |
| C16:0 | 19.50 | 19.28 | 21.60 | 21.02 | 0.26 | <0.001 | 0.14 | 0.51 |
| C16:1 | 1.62 | 1.51 | 0.97 | 0.96 | 0.04 | <0.001 | 0.26 | 0.41 |
| C18:0 | 9.14 | 9.20 | 16.35 | 15.73 | 0.33 | <0.001 | 0.55 | 0.40 |
| C18:1 | 39.96 | 39.34 | 31.15 | 31.75 | 0.30 | <0.001 | 0.96 | 0.04 |
| C18:2 | 23.67 | 24.27 | 23.74 | 24.23 | 0.45 | 0.97 | 0.21 | 0.91 |
| C18:3 | 0.77 | 0.78 | 0.75 | 0.78 | 0.02 | 0.53 | 0.32 | 0.50 |
| C20:0 | 0.19 | 0.18 | 0.25 | 0.26 | 0.01 | <0.001 | 0.97 | 0.23 |
| C20:1 | 0.95 | 0.98 | 0.83 | 0.88 | 0.02 | <0.001 | 0.02 | 0.65 |
| C20:3 | 0.09 | 0.10 | 0.09 | 0.10 | 0.003 | 0.37 | 0.11 | 0.97 |
| C20:4 | 0.33 | 0.34 | 0.27 | 0.28 | 0.01 | <0.001 | 0.42 | 0.83 |
| C18:1/C18:0 | 4.40 | 4.32 | 1.93 | 2.04 | 0.11 | <0.001 | 0.84 | 0.36 |
| SFA | 30.32 | 30.22 | 40.08 | 38.87 | 0.56 | <0.001 | 0.24 | 0.32 |
| MUFA | 42.95 | 42.28 | 33.27 | 33.92 | 0.35 | <0.001 | 0.98 | 0.05 |
| PUFA | 24.93 | 25.57 | 24.89 | 25.42 | 0.48 | 0.83 | 0.21 | 0.91 |

FIGURE 7 continued

| | | | | | | | |
|---|---|---|---|---|---|---|---|
| IV⁵ | 79.6 | 80.1 | 71.4 | 72.9 | 0.81 | <0.001 | 0.23 | 0.53 |
| Firmness score⁶ | 2.6 | 2.8 | 1.8 | 2.0 | 0.1 | <0.001 | 0.06 | 0.75 |
| Belly Thickness, in | | | | | | | | |
| Middle | 0.96 | 0.96 | 1.01 | 0.98 | 0.02 | 0.09 | 0.56 | 0.40 |
| Edge | 0.94 | 0.89 | 1.04 | 1.01 | 0.03 | <0.001 | 0.17 | 0.64 |

¹CON = negative control without CPFA and ractopamine
²CPFA = diet containing 0.0375% CPFA
³CON/Ractopamine = diet containing 4.5 grams/ton ractopamine for 3 weeks prior to harvest
⁴CPFA/Ractopamine = diet containing 0.0375% CPFA and 4.5 grams/ton ractopamine for 3 weeks prior to harvest
⁵IV = (C16:1 × 0.95) + (C18:1 × 0.86) + (C18:2 × 1.732) + (C18:3 × 2.616) + (C20:1 × 0.785) + (C22:1 × 0.723), according to AOCS (1998).
⁶Subjective firmness score: 1 = extremely firm to 3 = extremely soft

FIGURE 8

Concentration of cyclopropenoid fatty acids in belly fat

| Item | CON/No Ractopamine | CPFA/No Ractopamine |
|---|---|---|
| No. of samples | 6 | 6 |
| Cyclopropenoid fatty acids,[1] % | | |
| Sterculic | 0.68 | 0.68 |
| Malvalic | 0.11 | 0.10 |
| Total | 0.79 | 0.78 |

[1] Values are as-is basis.

METHOD OF FEEDING LIVESTOCK TO IMPROVE CARCASS CHARACTERISTICS

PRIORITY CLAIM

This application claims priority to provisional patent application No. 61/719,568 filed Oct. 29, 2012 and claims the benefit of that priority date.

FIELD OF INVENTION

Swine, cattle and poultry production has included feeding standard feed rations (diets), some of which are supplemented with various materials which may include unsaturated fatty acids (UFA) and/or (for cattle and swine) additives such as ractopamine, and some which are not so supplemented. The diets fed to these animals are known to affect certain carcass characteristics. The present invention comprises a method of feeding swine, cattle, and poultry that mitigates the negative effects of some diets on certain carcass characteristics of swine, cattle and poultry and improves carcass characteristics when compared to those resulting from feeding a standard diet.

BACKGROUND

Livestock production requires careful application of both science and animal husbandry practices in order to obtain the meat quality characteristics desired by the consumer. Feed costs are a livestock producer's most significant cost and it is desirable to manage expected carcass characteristics, include supplements in the diet that improve those characteristics, improve the health of the animal, and minimize the costs of the feed and other costs associated with livestock production.

Saturated fatty acids (SFA) tend to positively influence fat quality by increasing firmness when included in the diet; UFA tend to negatively affect fat by causing it to have a softer composition which translates to higher levels of oxidation, and increased slicing and processing difficulties. Fat firmness can be monitored by determining the fatty acid profile and calculating an iodine value (IV). Acceptable IV scores vary depending on the processor; however, as an example, at the present time, an IV score over 73 for swine frequently indicates soft fat and a less desirable carcass.

In recent years, ethanol production in the Midwest has become commonplace. The basic process includes cooking corn into mash, adding yeast and fermenting the mash, distilling off the ethanol, and thereafter separating the solids remaining from the liquid. Some of the liquid can be used as backset in the process, oil might be separated from the liquid, and additional solids might be separated from the liquid. The remaining and/or separated solids are called wet distiller's grains (WDG) and typically include around 70% moisture. Although high in protein and well suited for use as an animal feed supplement, the shelf life of WDG is very short. Therefore, WDG are often dried to around 10% moisture, creating a feed ingredient called dried distillers grains or dried distillers grains with solubles (both referred to herein as DDGS) with a much longer shelf life.

The interest in uses for ethanol process byproducts has grown since their more abundant availability due to the ethanol industry's growth since 2000. The DDGS is the result of removal of corn starch which results in concentration of non starch components of corn approximately three fold in the DDGS. DDGS includes nutritional and economic values that make them attractive for use as animal feeds or feed additives. Specifically, DDGS has about 9-10% fat (about double that of whole corn), around 8-9% fiber (approximately four times that of whole corn), about 25-30% crude protein (which is about 3½ times that of whole corn), around 0.6-0.9% lysine (about triple that of whole corn) without significant loss of calcium or phosphorus. However, DDGS also typically contains about 10% corn oil, which is high in UFA, so despite DDGS significantly lowering feed costs at higher inclusion rates, feeding only low levels of DDGS was recommended due to the negative carcass impact. For swine, DDGS was recommended at 10% of the diet for grow finish hogs, with a maximum of 20%. (Plain, Ron, "Feeding Distiller Grains to Hogs" Factsheet, Livestock Marketing Information Center, State Extension Services, University of Missouri-Columbia, Fall 2008). Iowa State University Extension recommended up to 20% DDGS in nursery, grow-finish, and lactating sow diets, and up to 40% for gestating sows; this paper further reported that diet levels above 20% DDGS can produce a softer, oilier fat in pigs. (Mark Honeyman, Peter Lammers, "Feeding Bioenergy Coproducts to Swine", Iowa State University Extension, IPIC 11a May 2007). Feeding DDGS can also reduce carcass yield in swine production. DDGS recommended supplementation rates in diets for cattle are also varied according to the growth stage or end purpose of the animal. Poultry diets can also be supplemented with DDGS.

Other than the effect on carcass yield and carcass fat mentioned herein, feeding DDGS does not change quality or grades of carcasses. Further, feed cost of gain will typically be reduced if the cost of DDGS is not at a level that is much greater than the cost of corn grain on a dry basis. In short, DDGS has high protein and fat content and can be included into a number of livestock diets.

The fat component of DDGS is corn oil and is known to affect carcass fat softness. (BioEnergy "The Influence of Dried Distillers' Grains on Carcass Fat in Swine" Mickey A. Latour, A. P. Schinckel, Purdue University, Purdue Extension ID-345-W 8/07). As a basic premise, pig body composition is affected by the feed's fat content. This is because pigs can directly deposit dietary fat into their fat depots. The transfer from diet to body fat is well characterized in grow-finish pigs. Id. Cattle and poultry do not share this mechanism of fat deposition, however, adding certain fat or increasing the level of fat in the diet does affect the hardness of the fat of poultry and bovine carcasses as well.

The addition of DDGS increases the level of UFA in the diet. In short, the acceptable level of DDGS in the diet is limited by its negative result of producing softer carcass fat and undesirable IV scores. There are other sources of UFA used in swine, cattle and/or poultry diets, including but not limited to, dried bakery product, corn oil, soybean oil, poultry fat and yellow grease, that also contribute to soft carcass fat. The present invention comprises a method of feeding that allows higher inclusion of DDGS and other sources of UFA while managing the softness of carcass fat and IV scores.

The economic advantages offered by substituting DDGS (or other less expensive feed materials that have increased fat content) for other more traditional feed components can be significant. Swine producers, poultry producers and cattle producers have continued to use DDGS as a feed supplement but do so at levels chosen to manage or avoid the negative effects that feeding more DDGS would be expected to cause. In other words, the full economic and nutritional benefits of DDGS supplementation are not being fully realized.

Ractopamine is a feed additive used to improve carcass leanness and growth rate in swine and cattle. Pharmacologically, it is a beta-adrenergic agonist that functions to increase protein synthesis resulting in increased muscle fiber size. Ractopamine is typically fed to growing swine during the last 3-5 weeks prior to slaughter to increase carcass lean and growth rate. Ractopamine is very commonly used as a feed additive in U.S. swine diets. It is estimated that over 70% of the swine produced in the U.S. have been fed ractopamine (personal communication with Elanco, makers of ractopamine). Ractopamine is used for similar purpose and with similar effects with cattle. However, ractopamine also has unfortunate negative impacts on meat quality. Carr et. al., (2005) observed that feeding ractopamine at 10 or 20 ppm for 25 to 41 days pre-slaughter resulted in poorer color scores, reduced tenderness and reduced flavor scores. Stoller et. al., (2003) reported that feeding ractopamine at 10 ppm for 28 days resulted in reduced color score, reduced tenderness score, increased chewiness score and increased Instron force of loin muscle. Aalhus, et. al., (1990) found that feeding ractopamine at 10 ppm for 35 days prior to slaughter increased sheer force of loin muscle and reduced hardness of fat samples taken from the loin.

Overall, desirable carcass characteristics can be measured and relate to lean color, marbling, lean firmness, water holding capacity, muscling, fatness, and softness of fat. What was needed was a method of feeding animals that would allow the maximum nutritional advantage of employing DDGS as a feed ingredient, would allow realization of the maximum economic advantage of employing DDGS, and would counter the negative effects otherwise expected from feeding relatively high levels of DDGS or other feed ingredients high in UFA. Further, what was needed was a method for countering the negative effects on carcass characteristics associated with the use of ractopamine. Finally, what was needed was a method for improving carcass characteristics expected from standard diets.

It is a first objective of the present invention to provide a method for feeding an animal a feed containing high levels of UFA without decreasing the melting point of the carcass fat or without the expected decrease in melting point of the carcass fat.

A second objective of the method is to provide a method for feeding livestock and poultry higher levels of UFA without increasing the IV score.

A third objective of the method is to provide a method for feeding meat-bearing livestock that improves meat quality (e.g., fat hardness, cooking loss, and belly thickness) while not adversely impacting the productivity of the animal (e.g., growth rate, feed efficiency) either when including DDGS or other supplements containing UFA at levels above the generally accepted levels, or when the UFA levels have not been increased.

A fourth objective of the method of the present invention is to reduce costs of animal feed by supplementing DDGS or other supplements with UFA, and decrease the IV score otherwise expected for UFA supplemented diets. One of the objectives is to increase the fat firmness over that which would have otherwise been expected from a diet supplemented with more than 20% DDGS in the early swine growth phase or more than 0% DDGS in the late swine growth phase.

A fifth objective of the method of the present invention is to reduce the negative effects otherwise expected when swine or cattle feed is supplemented with ractopamine.

A sixth objective of the present invention is to improve the carcass characteristics of swine or cattle or poultry fed standard diets without the addition of ractopamine and without higher than normal levels of UFA.

SUMMARY OF INVENTION

The present invention comprises a method of feeding swine and cattle to counter the negative carcass effects of ractopamine, a method of feeding swine, cattle and poultry to counter the negative effects of above-standard levels of UFA, and a method to improve carcass characteristics of poultry, cattle, or swine fed standard diets without ractopamine addition or UFA levels higher than standard. The method allows the producer to feed higher levels of UFA than recommended without the levels of negative effects typically expected. The method also allows a producer to counter at least some negative effects otherwise expected from supplementing feed with ractopamine. Finally, the method allows producers to improve carcass characteristics of animals that are fed diets without the addition of ractopamine and without inclusion of higher than standard levels of UFA.

Cyclopropenoid fatty acids (CPFA), including sterculic acid and malvalic acid, have been shown to increase the saturation of tissue fatty acids by deactivating $\Delta 9$-desaturase (stearoyl-CoA desaturase) activity that converts $C16:0$ to $C16:1$ and $C18:0$ to $C18:1$ (Greenberg and Harris, 1982; Yang et al., 1999). Studies have shown that feeding CPFA improved fat firmness in swine as a result of increased concentration of saturated fatty acids (SFA) and decreased concentration of monounsaturated fatty acids (MUFA) in carcass (Ellis et al., 1931; Irie and Nishimura, 1986).

The preferred embodiment of the invention comprises a combination of natural oils containing high levels of CPFA, stabilized with antioxidants, and accomplishes the objective of avoiding negative side effects otherwise expected when supplementing the feed with relatively high levels of UFA whether the result of feeding DDGS or other supplements including UFA. Alternatively, a single source of CPFA may be employed in amounts necessary to counter the effects of high levels of UFA in the diet. Further, feeding a single source or a combination of natural oils containing high levels of CPFA may be employed to counter the negative effects on some carcass characteristics which are associated with feeding ractopamine. Finally, feeding CPFA from a single source or from a combination of sources, or a combination of natural oils containing high levels of CPFA may improve carcass characteristics in animals otherwise fed diets without increased levels of UFA or ractopamine. The inventors discovered that including CPFA at levels between about 0.001% and 0.5% and between 0.0375% and 0.075% of the diet by weight assists in managing the negative effects of a diet high in UFA, counters the negative effects of ractopamine on carcass characteristics, and improves certain carcass characteristics in animals not fed high levels of UFA or ractopamine. It was determined that inclusion at appropriate rates can: (a) counteract the lowering of carcass fat melting point; (b) reduce IV scores below what would be expected from a UFA enriched diet; (c) reduce feed costs; and (d) positively affect certain qualities of the eventually processed meats.

BRIEF DESCRIPTION OF THE DRAWINGS

FIG. 1 is a table showing the nutrient composition of an experimental and a control diet employed in the present invention;

FIG. 2 is a table presenting data related to certain effects of dietary supplementation of CPFA on growth performance and carcass characteristics;

FIG. 3 is a table presenting data resulting from dietary supplementation of CPFA on fatty acid profile of belly fat and on belly firmness;

FIG. 4 is a table presenting data regarding the experimental diets administered;

FIG. 5 presents data related to the effects of supplementation of CPFA on growth performance and carcass characteristics;

FIG. 6 presents data related to the effects of supplementation of CPFA and/or ractopamine on loin muscle quality FIG. 7 presents data related to the effects of supplementation of CPFA and/or ractopamine on fatty acid composition, firmness and thickness of belly fat; and FIG. 8 presents data related to the effects of supplementation of CPFA on CPFA content of belly fat.

DETAILED DESCRIPTION OF THE INVENTION

The present invention employs the principal that CPFA can affect the softness of carcass fat in livestock and poultry when fed with a diet supplemented with UFA (which may include DDGS, even if the DDGS level is over 20% in the early swine growth phase or over 0% in the late swine growth phase). Research has shown that feeding CPFA can have effects on the melting point of carcass fat (it can make the melting point of body fat increase) which translates to positive taste and texture impacts on the harvested meat, and to more favorable processing and quality characteristics of the carcass. Moreover, the inventors have determined that not only the melting point of carcass fat may be affected, but that other carcass characteristics are also improved in the face of UFA supplemented diets, application of ractopamine, or even where the diet is supplemented neither with UFA nor with ractopamine.

The present invention provides a method of feeding swine, cattle or poultry a diet comprising a level of UFA (for example, in the form of DDGS) higher than the levels typically recommended. DDGS typically contains about 10% corn oil which is high in UFA. Unsaturated fats are preferentially deposited in adipose tissues, leading to soft carcass fat. The diet employed by the present invention comprises between about 20% to about 40% and up to about 50% DDGS containing 10% corn oil fed with a supplementation of CPFA. The UFA source is not required to be DDGS, though DDGS is used here as a working example of the invention given the prevalence of feeding DDGS to livestock and poultry. The amount of CPFA in this diet falls within the range of between about 0.001% and about 0.5% of the diet. The method of the present invention includes diets that comprise sources of UFA in addition to or instead of those provided by DDGS, includes diets not supplemented with UFA but that include ractopamine, includes diets supplemented with a source of UFA and including ractopamine, and includes diets that are not supplemented with a source of UFA and do not include ractopamine. Appropriate diet composition in all cases comprised between about 0.001% and 0.5% CPFA by weight in order to achieve the desired effects.

EXAMPLE 1

A study was conducted employing five different dietary treatments for grow finish hogs during the six weeks before harvest. Pigs were fed a diet containing 7% UFA and with one of three levels of CPFA for either 4 weeks or 6 weeks before harvest. The treatment levels of CPFA as a percentage of the diet were: 0.0375% CPFA for 4 weeks; 0.075% CPFA for 4 weeks; 0.0375% CPFA for 6 weeks, 0.075% CPFA for 6 weeks, and a control without added CPFA for 6 weeks. The study evaluated growth performance, feed disappearance and feed conversion ratio. It measured carcass characteristics including hot carcass weight (HCW); $10^{th}$ rib backfat depth, adjusted to skin-on basis according to the National Pork Producers Council (NPPC) (2000) recommendations; loin eye area; and fat-free carcass lean percentage estimated using the NPPC (2000) equation. Fatty acid profile and IV of belly fat were obtained by chilling carcasses at 4 degrees C. for 24 hours before collection of belly fat samples. IV of belly fat was calculated using the AOCS (1998) equation: IV=(C16:1×0.95)+(C18:1×0.86)+(C18:2×1.732)+(C18.3×2.616)+(C20:1×0.785)=(C22:1×0.723). The degree of belly fat firmness was measured by draping the center of the belly over, and perpendicular to, a smoke stick, with the fat side facing down. The lateral (L) and vertical (V) of the belly flex were measured and used to calculate the flop angle: $\tan^{-1}$ (L/V) where L is one-half the distance between the belly ends while hanging over the stick and V is the vertical distance of belly flex. The specifics of the treatment diets are shown in FIG. 1.

For each of the five treatment groups, FIG. 2 shows the data collected. As can be seen by the data, the diets comprising a higher level of CPFA showed belly flex scores markedly better than for the pigs fed the control diet without CPFA. Further, IV score was significantly reduced by the inclusion of CPFA in the diets.

EXAMPLE 2

A second study was conducted to evaluate the effects of supplementation of CPFA, with and without ractopamine, in a diet containing a high level (40%) of DDGS, on growth performance, carcass characteristics, meat and fat quality in commercial finishing pigs. The experimental diets over a six-week feeding period were a control diet without CPFA and a diet containing 0.0375% CPFA for six weeks; then for the last three weeks a diet was fed that included ractopamine at 4.5 grams per ton for each of the control and CPFA diets. (See FIG. 4). CPFA was added to replace choice white grease in the control diet. As discussed below, no treatment effects on growth performance were observed nor for HCW, dressing percentage or loin muscle, ultimate pH, color or marbling. Supplementation of CPFA in late finishing diets significantly changed fatty acid profile and IV of belly fat. It also increased C18:0/C18:1 ratio, and increased saturated fatty acids and reduced monounsaturated fatty acids.

Pig body weight (BW) on a pen basis was measured initially and at the end of weeks 3 and 6 to calculate average daily gain (ADG). On each weigh day, feed disappearance was measured to calculate average daily feed intake (ADFI) of pigs on pen basis. Pen ADG and ADFI were, in turn, used to calculate feed conversion ratio (F:G).

Pigs were all harvested on the same day and also weighed individually one day before harvest to obtain a final live BW. HCW was measured on carcasses immediately after harvest. Live BW and HCW of pigs were used to calculate dressing percentage using the following equation: dressing %=(HCW/live BW)×100. Backfat (BF) and loin depth (LD) were measured between the $3^{rd}$ and $4^{th}$ rib on each carcass using Fat-O-Meater (Generation II). Percentage of fat-free carcass lean was calculated by Fat-O-Meater using the values of backfat depth and loin depth.

One barrow and one gilt from each pen weighing closest to the mean BW of their pen were selected for evaluation of meat and belly fat quality. Twenty-four hours after carcasses were chilled at 4° C., pH of loin muscle (LM) was measured at the 10$^{th}$ rib using a pH meter. The pH meter was calibrated at the temperature of the LM with pH 4 and 7 buffers. After pH measurement, carcasses were fabricated. Loin muscle samples at the 10$^{th}$ rib were collected for evaluation of meat quality.

Each LM sample was separated into two equal halves, and vacuum-packaged and frozen at −20° C. until analysis. One section of LM sample was measured for Minolta color (L*: lightness; a*: redness; b*: yellowness), loin purge, chop purge, and Instron force (a measurement correlated with tenderness and chewiness). Japanese color score (1=extremely pale to 6=extremely dark; NPPC, 2000) and marbling score (1=1% intramuscular fat to 10=10% intramuscular fat; NPPC, 2000) were also determined by trained panelists.

The other section of the LM sample was used for sensory evaluation. Sensory assessment was performed according to the procedure described by the American Meat Science Association (1995). Samples of LM were thawed at 4° C. overnight and cut into chops approximately 1 inch thick. The chops were weighed before and immediately after cooking to determine cooking loss. After cooking, trained panelists evaluated chops for juiciness, tenderness, chewiness, flavor and off-flavor using a 10-point scale (1=extremely dry, tough, not chewy, none, or none, to 10=extremely juicy, tender, chewy, intense, or intense, respectively).

In addition to LM, belly core samples at the midline opposite the last rib were also collected from the carcasses for evaluation of fatty acid composition, IV, subjective firmness score, and thickness. Each belly fat sample was separated into three equal halves, and vacuum-packaged and frozen at −20° C. until analysis. One section of belly fat samples was analyzed for fatty acid composition using gas chromatography according to AOCS (1998) method Ce 1-62. The IV of fat was calculated using the following equation (AOCS, 1998): IV=(C16:1×0.95)+(C18:1×0.86)+(C18:2×1.732)+(C18:3×2.616)+(C20:1×0.785)+(C22:1×0.723). Thickness was measured in the middle and edge of another section of belly fat samples. Subjective belly firmness score was measured using a 3-point scale (1=extremely firm to 3=extremely soft).

To determine the CPFA residue in carcass fat, each of 6 (3 barrows, 3 gilts) belly fat samples from the third section were randomly selected in control and experimental treatments. Samples were sent for analysis of individual CPFA using HPLC according to the method described by Wood (1986).

All data were analyzed using the MIXED procedure of SAS Inst. Inc. (Cary, N.C.). Pen was used as the experimental unit for all responses. The statistical model included the fixed effects of CPFA, ractopamine, CPFA×ractopamine interactions, and random effect of block. Live BW before harvest and sex were used as the covariates in analysis of carcass characteristics, meat and fat quality, if the effects of these covariates were significant (P<0.05). All results are reported as least squares means. Multiple comparisons among treatments were performed using PDIFF and adjusted by the Tukey option for multiple comparisons of means. The significance level chosen was α=0.05. Treatment effects were considered significant if P<0.05, whereas values between 0.05≤P≤0.10 were considered statistical trends.

Growth performance was not affected by CPFA as measured by ADG, ADFI and, F:G, and weight at harvest. Feeding ractopamine affected weight at harvest, ADG and ADFI as well as reduction of back fat, increase in loin depth which, in turn, increased by 2% the measure of carcass lean. CPFA did not affect color, pH, loin and chop purge, marbling score or Instron force of LM samples (see FIG. 6) although ractopamine did affect redness, yellowness, lightness and Instron force (which is a measure negatively correlated with tenderness, positively correlated with chewiness). CPFA reduced cooking loss as did ractopamine. Neither CPFA nor ractopamine alone affected juiciness or off-flavor scores but in the diets combining the two a positive interaction for tenderness and chewiness was observed in which CPFA offset the negative effects of ractopamine on tenderness and chewiness.

FIG. 7 provides results related to fatty acid composition and belly fat firmness and thickness. CPFA increased SFA content, and reduced MUFA content in belly fat, largely due to increased C16:0 and C18:0 and decreased C16:1 and C18:1 content in belly fat of pigs fed CPFA. The change in fatty acid profile significantly reduced the IV score when compared to the control. The content of PUFA was not affected. Pigs fed CPFA had firmer bellies as measured on a 1 to 3 scale, and increased edge thickness and middle thickness of the belly. Interestingly, feeding CPFA as described herein did not change CPFA deposition in carcass fat (FIG. 8). Based on the data, the inventors concluded that the effects of a diet supplemented with DDGS on carcass fat may be countered fully or in part by also supplementing with CPFA without compromising growth performance, carcass characteristics and/or meat quality.

As expected, feeding ractopamine at 4.5 grams/ton had statistically significant positive effects on ADG, F:G, final BW and carcass lean % (FIG. 5). However, feeding ractopamine also resulted in significant negative effects on meat quality including reductions in Minolta a* and b*, an increase in Instron force, increased cooking loss, reduced tenderness and increased chewiness, and a reduction in flavor score (FIG. 6). Supplementing CPFA at 0.0375% of the diet for 6 weeks reversed the negative effects of Paylean on cooking loss, tenderness, chewiness and flavor (FIG. 6).

In practice, the state of animal development will also influence the level of CPFA necessary to accomplish the objectives. Further, this required level will be influenced by the species to which the method is applied and will be influenced by the objectives and costs of the other feed components. The data in the figures show that the effective rate of addition of CPFA to the diet results in harder fat, lower IV score, and improvement in meat quality (fat hardness, meat firmness, belly thickness, cooking loss, tenderness, chewiness and flavor) while not adversely impacting the productivity (growth rate and feed efficiency) of the animal. The cost of feed, when supplemented with a source of UFA such as DDGS, is reduced from the control by employing CPFA because DDGS and other feedstuffs high in UFA can be used at higher levels in the diet while still meeting the IV level and/or other meat quality measurements specified or desired by the meat processor. The source of CPFA may be, and should be, selected with an eye toward the other constituents in the source and the costs of that source. Source possibilities include, but are not limited to, cotton seed, kapok seed, saba nut, and malabar chestnut, and blends thereof.

The supplementation of CPFA to the animal's diet may be made by blending it in the feed or by other methods of oral administration. CPFA may be used as a top dress or provided via a liquid feed system or, perhaps through the water delivery system. In short, the CPFA may be fed in any manner that encourages the animal to ingest the source of CPFA.

The present invention has been described in detail. While example embodiments have been particularly shown and described with reference to steps, amounts, additions, and combinations, it will be understood by those of ordinary skill in the art that various changes in form and details may be made therein without departing from the spirit and scope of the invention.

What we claim is:

1. A method of improving firmness of fat in pigs by oral administration of a diet comprising about 2% or more unsaturated fatty acids (UFA) wherein said diet also comprises between about 0.001% and about 0.5% by weight of a supplemental source of cyclopropenoid fatty acids (CPFA) fed over a plurality of days during the last 10 weeks prior to harvest.

2. The method of claim 1 wherein at least a portion of said diet comprises byproducts from an ethanol production process, said method resulting in higher promotion of muscle and increased fat firmness as measured by a decrease of at least one point in an IV score as compared to an IV score where the diet comprises a lower level of UFA.

3. A method of improving firmness of fat in pigs said method comprising: orally administering a diet wherein the diet comprises an amount of unsaturated fatty acids (UFA) above about 2% and an amount of a supplemental source of cyclopropenoid fatty acids (CPFA) wherein said amount comprises between 7 and about 60 grams of CPFA per pig, said method resulting in improvement of at least one of a group of carcass characteristics consisting of: belly thickness, belly firmness, and IV score.

4. A method of improving firmness of fat and reducing feed costs said method comprising oral administration of a diet to pigs comprising an ingredient having at least about 2% unsaturated fatty acids (UFA) and lower costs than the base feed, and a supplement comprising at least one source of cyclopropenoid fatty acids (CPFA) in an amount between about 0.001% and about 0.5% of said diet fed over a period of time comprising between 1 day and 10 weeks, said amount effective to decrease the body fat softening effect of UFA, without a reduction in carcass belly fat melting point and without an increase in IV.

5. The method of claim 4 wherein said ingredient comprises distillers dried grains with solubles (DDGS).

6. The method of claim 4 wherein said source of CPFA is fed to the animal during the last 10 weeks before harvest by at least one of a group of feeding regimes consisting of: mixed with feed, used as a top dress, delivered through a water delivery system, or delivered through a liquid feeding system.

7. The method of claim 3 further comprising feeding said diet during at least one of the 8 weeks prior to harvest and said method results in a measurable reduction of the IV score.

8. The method of claim 7 wherein at least a portion of said diet comprises byproducts from an ethanol production process.

9. The method of claim 4 wherein said livestock comprise male swine vaccinated to induce immunocastration.

* * * * *

(12) SUPPLEMENTAL EXAMINATION CERTIFICATE

United States Patent
Hagen et al.

(10) Number: US 9,538,774 F3
(45) Certificate Issued: Jan. 25, 2018

Control No.: 96/000,248
Primary Examiner: Johnny F. Railey II

Filing Date: Dec. 29, 2017

No substantial new question of patentability is raised in the request for supplemental examination. See the Reasons for Substantial New Question of Patentability Determination in the file of this proceeding.

(56) Items of Information

OTHER DOCUMENTS

Cao, J., J. P. Blond, and J. Bezard, Inhibition of fatty acid delta-6 and delta-5 desaturase by cyclopropene fatty acids in rat liver microsomes. Biochim. Biophys. Acta. 1210: 27-34 (1993)

Jeffcoat, R. and M. R. Pollard, Studies on the inhibition of the desaturases by cyclopropenoid fatty acids. Lipids 12:480-485 (1977)

Yang, A., T.W. Larsen, S.B. Smith, and R.K. Tume, A9 desaturase activity in bovine subcutaneous adipose tissue of different fatty acid composition. Lipids 34: 971-978 (1999)

Chilliard, Y., Dietary fat and adipose tissue metabolism in ruminants, pigs, and rodents: A review. J. Dairy Sci. 76:3897-3931 (1993)

Ravindran, V., "Minor oilseed meals", Nontraditional Feed Sources for Use in Swine Production, Ed. P.A. Thacker and R.N. Kirkwood, Stoneham, MA: Butterworth Press (1990), page 250

Sahai, B.; Kehar, N. D., Investigation on subsidiary feeds: Ceiba pentandra seed as a feed for livestock. Indian J. Vet. Sci., 38: 670-673 (1968)

Brown, W. H., J. W. Stull, and G. H. Stoot, Fatty acid composition of milk. I. Effect of roughage and dietary fat. J. Dairy Sci. 45:191-196 (1962)

Ganegoda, G. A. P., and J. A. de S. Siriwardana, Effect of feeding kapok seed meal to growing pigs and broiler chickens. Ceylon Vet. J. 26:53(1978)

Kadirvel, R., R. Natanam and K. Udayasurian, Use of kapok as a poultry feed. Poul. Sci. 65:2363-2365 (1986)

Narahari, D., and R. A. Rajini, Chemical composition and nutritive value of kapok seed meal for broiler chickens. British Poultry Science 44:505-509 (2003)

Siriwardene, J. A. De S., Dip AgricSc., and H. B. Manamperi, Effect of feeding kapok seed meal on growth of broiler chickens. Ceylon Vet. J. 27:26-28 (1979)

SUPPLEMENTAL EXAMINATION CERTIFICATE
US 9,538,774 F3
Control No. 96/000,248

National Pork Producers Council, Assessment procedures: Pork composition & quality. National Pork Board, as implemented by the National Pork Producers Council. Natl. Pork Producers Council, Urbandale, IA (2000)